United States Patent [19]

Keller, Jr.

[11] Patent Number: 4,740,486
[45] Date of Patent: Apr. 26, 1988

[54] CERAMIC COMPOSITION TO MAKE CEMENT WITH INSULATING PROPERTIES

[76] Inventor: Fred Keller, Jr., 1410 Winston Cir., Bethlehem, Pa. 18017

[21] Appl. No.: 924,891

[22] Filed: Oct. 30, 1986

[51] Int. Cl.$^4$ .................. C04B 33/22; C04B 20/00
[52] U.S. Cl. ........................... 501/83; 106/93; 106/97
[58] Field of Search ............ 501/83; 106/93, 97; 428/402

[56] References Cited

U.S. PATENT DOCUMENTS

| Re. 10,419 | 12/1883 | Gilman | 501/83 |
| 353,631 | 11/1886 | Gilman | 501/83 |
| 2,278,957 | 4/1942 | Walker et al. | 501/83 |

OTHER PUBLICATIONS

*The Nature and Properties of Engineering Materials*, Z. Jastrzebski, John Wiley & Sons, 1977, New York, p. 529.

*Primary Examiner*—William R. Dixon, Jr.
*Assistant Examiner*—David M. Brunsman
*Attorney, Agent, or Firm*—Ruth Moyerman

[57] ABSTRACT

A composition for building blocks is a mixture of cement, ceramic grog and ceramic aggregate beads. The ceramic grog and aggregate are formed as a mixture of clay and dried organic mulch. After firing, the resulting ceramic product is porous. When added to the cement, the porous ceramic grog and aggregate greatly enhance the insulation qualities of the resultant cement structure.

5 Claims, 1 Drawing Sheet

CERAMIC COMPOSITION TO MAKE CEMENT WITH INSULATING PROPERTIES

BACKGROUND OF THE INVENTION

1. Field of the Invention

This invention relates to a cement composition and building blocks formed therefrom.

2. Description of the Prior Art

Today's building industry is experimenting with building blocks of many different compositions. Primarily, buildings are constructed of precast concrete blocks made with a variety of grades and types of cements. In order to impart greater insulation qualities to concrete blocks, they have been formed with hollow interiors into which insulating foam or the like has been placed. Others impart greater insulation value by adding insulators to the cement mixture. Examples of such additives commonly used are expanded polystyrene beads, perlite minerals and the like. These additives have the dual advantage of increasing the insulation qualities of the block as well as making the block lightweight.

Two problems have occurred with blocks made with the aforementioned materials. First, as more insulation material is added to the cement, the block becomes lighter and less strong. Second, polystyrene beads and perlite both tend to float when mixed into the water based cement. U.S. Pat. No. 2,727,827 to Charikof addresses the problem of floating perlite by coating the mineral with an air release inhibitor.

Other additives are also commonly added to perlite/cement mixtures. Additionally, perlite has little compression strength when used in quantities to provide good insulation qualities. Also, perlite is an expensive additive when used in quantities necessary for good insulation.

No prior art is known which overcomes the problems of both floating and compression of cement additives by adding ceramic aggregate or grog to cement. Ceramic aggregates do not float and need no additives to mix completely with the cement. Presently there is no known composition for building blocks which combines cement with inexpensive and plentiful ceramic materials.

SUMMARY OF THE INVENTION

The aforementioned prior art problems are obviated by the compostion of this invention in which cement is mixed with ceramic grog and aggregates to form a building block with high insulation values. By grog is meant a fired refractory material which is preferably crushed. In this invention, grog replaces sand commonly used to mix with cement to form concrete. Aggregate is usually sand and pebbles added to cement to make concrete, but in this composition aggregate is used to describe the formed ceramic bead which replaces pebbles in the cement/ceramic composition of this invention. In the preferred composition, the ceramic portion is formed from clay (preferably a high fire clay of cone 6) mixed with organic mulch at a ratio of about one part clay to about two parts mulch by volume. The mulch may be straw, grass clippings, sawdust or other dry organic mulch.

The ceramic mixture thus created is then processed into two different forms of starting material. The first form is grog which is produced when the clay/mulch mixture is rolled out in sheets to dry. These sheets are then fired. During firing, the mulch burns out, leaving small air holes in the sheet. The sheet is then crushed to produce granular grog, the grains being porous. The second starting product formed from the clay/mulch is aggregate beads which are generally semi-ovoid and include a central depression. The beads are fired to produce ceramic beads which are extremely porous. The air holes in the grog and beads impart insulating properties to the resultant cement/ceramic composition. The grog and aggregate are then mixed together with cement at a ratio of preferably one part cement to two parts grog to three parts aggregate (beads) by volume to produce the composition of this invention.

It is preferred that an H-shaped building block which enhances the properties of the composition be formed from the composition. The preferred block is generally an elongated block which forms an H in vertical cross section. The long edges of the blocks may be glued together when building a wall. Because the blocks may be glued together, people with no previous masonry experience may build with this product.

It is therefore an object of this invention to provide a composition for building blocks which combines the strength and insulating qualities of ceramics with cement.

It is another object of this invention to provide a composition for building blocks which uses inexpensive and plentiful clay as an ingredient.

It is still another object of this invention to provide a composition for building blocks which uses inexpensive and plentiful organic mulch as a pre-mix ingredient.

It is yet another object of this invention to provide a composition for building blocks which utilizes a ceramic bead as an ingredient.

It is a further object of this invention to provide a building block made of a cement/ceramic composition for strength and insulation.

It is yet another object of this invention to provide a building block with hollow areas into which additional insulation may be fitted.

It is still a further object of this invention to provide a building block which does not require mortar.

It is yet a further object of this invention to provide a lightweight building block.

These and other objects will be more readily ascertainable to one skilled in the art from a consideration of the following Figures, description and exemplary embodiments.

BRIEF DESCRIPTION OF THE DRAWING(S)

DETAILED DESCRIPTION OF THE PREFERRED EMBODIMENT(S)

Figure 1:
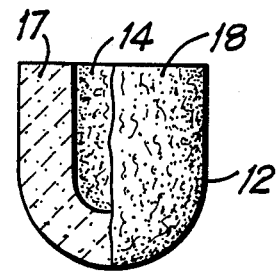
FIG. 1 illustrates in partial cross section the ceramic aggregate bead of this composition.

The composition for building blocks of this invention relates to a combination of ceramic materials and cement and, if desired, cement additives well known in the art. The ceramic material is made from a mixture of clay and organic mulch. The organic mulch is preferably sawdust or dried hay, but dried grass clippings or other dry organic mulch is possible. The clay is preferably a cone 6 clay, although any clay, which when fired to its vitrification temperature is light in color, is suitable. Darker clays are dark because they contain impurities such as iron which make them unsuitable for building blocks. Thus, clays from cone 2 to cone 14 are all usable; however cone 4 (2167 degrees F.) to cone 6 (2491 degrees F.) are preferred for economic reasons.

Aggregate and grog may be formed from different clays according to desired firing temperatures. For example, the following chart gives recipes which are possible for firing at cone 2 or cones 10-15.

| Weight Units | Firing at Cone 2 | Unit Weight | Firing at Cones 10-15 |
|---|---|---|---|
| 12 | Ball Clay | 25 | Ball Clay |
| 2 | Kaolin | 25 | Kaolin |
| 7 | Soda Feldspar | 25 | Potash Feldspar |
| 5 | Flint | 25 | Flint |
| 2 | Red Clay | | |

The preferred cone 6 clay is mixed with organic mulch at a preferred ratio of about one part clay to about two parts mulch to form a premix. This ratio may differ according to the clay and mulch and is determined by the desired weight of the aggregate to be produced. For example, with cone 6 clay and sawdust, the preferred ratio is 30% dry clay to 70% sawdust by volume. With cone 12 clay and dried grass, the preferred ratio is 35% clay to 65% straw by volume.

After the clay/mulch premixture is made, two starting products are produced. One is a grog made by rolling sheets of the premix out to dry. The sheets are then fired to the clay's vitrification point (at about 2300 degrees F.) during which process the mulch burns out, leaving a multitude of tiny air holes in the sheet of ceramic. The porous sheet is then crushed to produce a granular lightweight grog which serves as a replacement for sand in the composition of this invention. The grog is about half the weight of sand and is a much better insulator.

The second product formed from the clay/mulch premixture is aggregate in the form of beads. Bead 12, as seen in FIG. 1, is preferably semi-ovoid and of a preferred ½ inch diameter. Both interior 17 and exterior 18 are pitted because the mulch has burned out. A central cavity 14 is formed in each bead to prevent explosion during the firing. The beads replace prior art gravel in the cement/ceramic composition of this invention. The beads are lighter in weight than gravel, but have ceramic strength and insulation value.

Figure 2:
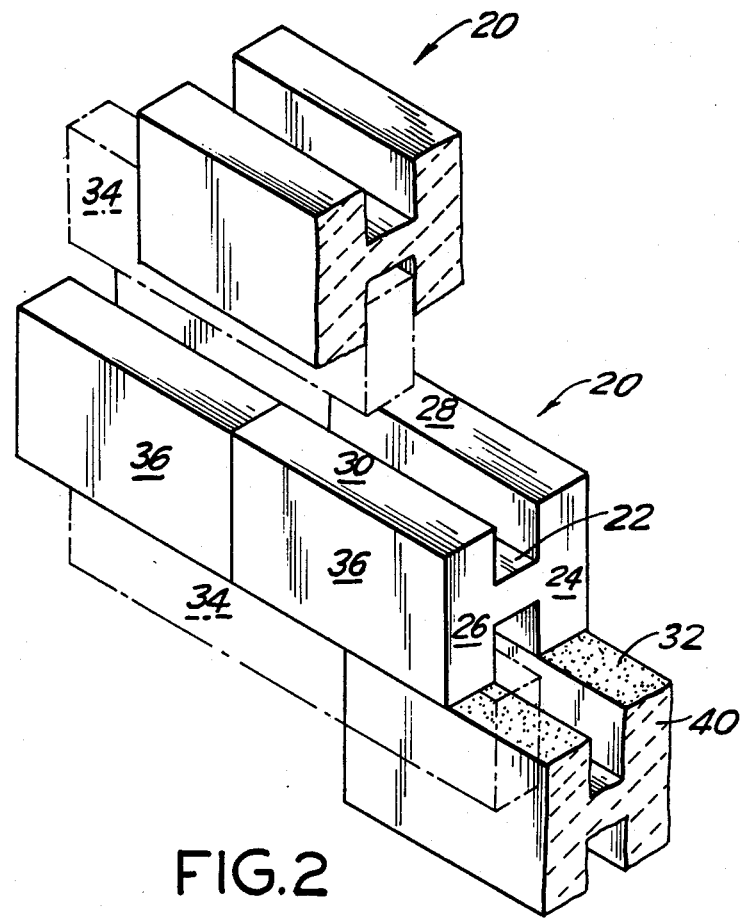
FIG. 2 is an isometric view of several building blocks made of the composition of this invention, the blocks stacked to form a wall segment.

It is preferred that the aggregate beads and grog be formed to have a weight of about 0.013 to 0.033 pounds per cubic inch. Ceramic mixtures weighing less will not have the desired compression strength, and mixtures weighing more will have less insulation value. For example, a 9 inch block of this composition (as seen in FIG. 2) and made with ceramic beads and aggregate made of one part cone 6 clay to two parts sawdust mulch and mixed with cement at a ratio of one part cement to two parts grog to three parts aggregate will have the improved insulation rates over a cement block without ceramic grog. A block made with 1 part cement, 2 parts sand and 3 parts aggregate bead has a density of approximately 110 lb./ft.$^3$ and an R value of 3.4. A block made of the composition of this invention having 1 part cement, 2 parts ceramic grog and 3 parts ceramic aggregate has an R value of 4.2.

To make the preferred cement composition, the three parts are mixed preferably at the ratio of one part cement to two parts ceramic grog to three parts ceramic aggregate beads. The resultant composition is formed into a 6-inch×8-inch×9-inch block with a weight of 17.34 pounds, a density of 69.48 pounds per cubic foot, a crush resistance of 1,250 pounds per cubic inch, and an R value of 4.24 per inch. Other ratios of mixing are possible, but for combined strength and insulation, the 1:2:3 ratio is preferred. A nine inch block made of this composition has the same or greater insulation value as a twelve inch block made from a cement/polystyrene expanded bead mixture. Thus a smaller block, which is more readily utilized because of its self-aligning configuration, can offer the same or greater insulation in a smaller wall.

There are many grades of cement and many possible clays and mulches which might be used in this composition. But, the important novel feature of strong ceramic clays and organic mulch which burns away to produce a strong ceramic insulating grog and aggregate is central in all combinations. For example, it is possible to produce a composition for road surfaces on bridges by using a harder aggregate formed from a clay containing iron oxide and nickel. A lighter aggregate from Kaolin clay would provide a good insulating composition for basement construction.

Although a semi-ovoid bead 12 is preferred because of ease of manufacture and rapid firing, other shapes are possible; for example, beads may be cross or annular in cross section.

Now referring to FIG. 2, a novel shaped building block 20 is seen. Block, generally 20, has leg 26 and leg 24 joined by crosspiece 22. Legs 26 and 24 are rectangular blocks which, when placed on their lengthwise edges, in vertical cross section, form an H with crosspiece 22. Because the composition described above produces a building block of surprising strength and insulation, it may be formed into blocks which do not require mortar or skill to put together. To build a wall with H-shaped blocks 20, long edges 30 and 28 of legs 26 and 24 respectively are placed on top of identical surfaces 32, and legs 26 and 24 against surface 40. Surfaces 32 and 40 have been spread with a waterproof glue. No mortar is necessary with blocks 20. Because they are lightweight, blocks 20 are easy to lift and align. No special skill or strength is necessary to build a wall from blocks 20.

For additional insulation, formed sheet insulation 34 may be placed in the hollow spaces created by placing blocks 20 upon each other. When used in home construction, blocks 20 with surface 36 facing outward will provide a strong and insulated outside wall for a home.

There are many variations possible within the scope of this invention. First, different qualities of clay may be used to produce the ceramic portion of this composition. Although Portland cement has been tested, many grades of cement are possible as is well known in the art.

Organic mulch may be straw, sawdust or the like.

Although an H-shaped block has been illustrated, it should be understood that the composition of this invention may be poured or precast into any shape, mold or form.

There are a great number of advantages to this invention. Chiefly, the composition of this invention uses inexpensive and plentiful materials to produce a composition for building blocks which offers both strength and good insulation. A variety of clays may be used, as well as a variety of organic mulches. The preferred building block is lightweight and easily built into walls. Added insulation is simple and inexpensively built into the wall.

Having now illustrated and described my invention, it is not my intention that such description limit the invention, but that the invention be limited only by a reasonable interpretation of the appended claims.

What is claimed is:

1. In a cement based composition for building blocks with insulating properties, the improvement comprising the addition to about one part by volume dry cement composition of a mixture of:
   (a) about two parts ceramic grog comprising a granular mixture formed from a premix of organic mulch and clay in the ratio of from about one part clay to about two parts organic mulch by volume, said premix being fired to a temperature from about 2000° F. to about 2400° F.; and,
   (b) about three parts ceramic aggregate shaped as beads, said aggregate being formed from a mixture of organic mulch and vitreous clay the shaped mix being fired at a temperature of from about 2000° F. to about 2400° F. in a ratio of one part clay to about two parts organic mulch by volume, each said bead generally including at least one central cavity.

2. The composition for building blocks according to claim 1 wherein each said bead is ovoid and approximately one-half inch in length and weighs from about 0.013 to about 0.033 pounds per cubic inch.

3. A method for producing a ceramic composition for building blocks comprising:
   (a) mixing vitreous clay with organic mulch, said clay having a firing temperature of from about cone 2 (2000 degrees F.) to about cone 14 (2400 degrees F.);
   (b) shaping a portion of the mixture of step (a) into beads, each said bead being generally a semi-ovoid with a hollow depression;
   (c) firing said beads at a temperature of approximately 2200 degrees F. to vitrify simultaneous with burning off said organic mulch to form a ceramic bead with a plurality of air pockets;
   (d) rolling a portion of said mixture of step (a) into sheets;
   (e) drying said sheets of step (d);
   (f) firing said sheets to vitrification;
   (g) crushing said sheets to form a granular grog with a plurality of air pockets in said granules; and,
   (h) mixing cement, said grog of step (g) and said beads of step (c) to form a dry cement composition for building.

4. The method for producing a ceramic composition according to claim 3 wherein the materials of step (h) are mixed at a ratio of one part cement to two parts grog to three parts aggregate by volume.

5. A method for producing a building block comprising:
   (a) mixing vitreous clay with organic mulch, said clay having a firing temperature of from about cone 2 (2000 degrees F.) to about cone 14 (2400 degrees F.);
   (b) shaping a portion of the mixture of step (a) into beads, each said bead being generally an ovoid with a hollow depression;
   (c) firing said beads at a temperature of approximately 2200 degrees F., burning off said organic mulch to form a ceramic bead with a plurality of air pockets;
   (d) rolling a portion of said mixture of step (a) into sheets;
   (e) drying said sheets of step (d);
   (f) firing said sheets to vitrification;
   (g) crushing said sheets to form a granular grog, said granules including a multiplicity of air pockets;
   (h) mixing said beads of step (c) with said grog of step (g) and cement in the ratio of one part cement, two parts grog and three parts beads;
   (i) mixing said composition formed in step (h) with water to form a concrete; and
   (j) extruding an amount of concrete from step (i) into a building block.

* * * * *